United States Patent [19]

Oldberg

[11] 4,069,668
[45] Jan. 24, 1978

[54] DISPERSION EXHAUSTER FOR ENGINES AND COMBUSTION HEATERS

[75] Inventor: Oscar Oldberg, Springfield, Va.

[73] Assignee: The United States of America as represented by the Secretary of the Army, Washington, D.C.

[21] Appl. No.: 698,659

[22] Filed: June 22, 1976

[51] Int. Cl.² .................... F01N 3/02; F23L 17/00
[52] U.S. Cl. .................................. 60/317; 60/320; 98/84; 98/DIG. 10
[58] Field of Search ............... 60/39.5, 264, 271, 317, 60/320, 324; 98/59, 66 R, 76, 78, 83, 84, 122, DIG. 10

[56] References Cited

U.S. PATENT DOCUMENTS

| D. 135,040 | 2/1943 | Rowland | 98/84 X |
| 3,209,670 | 10/1965 | Twickler | 98/84 |
| 3,457,724 | 7/1969 | Gandy et al. | 60/317 |
| 3,817,030 | 6/1974 | Renius et al. | 60/39.5 X |

FOREIGN PATENT DOCUMENTS

| 1,184,466 | 2/1959 | France | 98/84 |
| 1,152,301 | 9/1957 | France | 98/84 |
| 926,873 | 4/1955 | Germany | 98/83 |
| 178,470 | 11/1935 | Switzerland | 98/84 |
| 746,590 | 3/1956 | United Kingdom | 60/317 |

Primary Examiner—Carlton R. Croyle
Assistant Examiner—Michael Koczo, Jr.
Attorney, Agent, or Firm—Nathan Edelberg

[57] ABSTRACT

A cap and insulating tube are utilized in conjunction with a flared exhaust pipe to disperse the hot exhaust gases and provide an infrared camouflaging of the engine or heater.

5 Claims, 1 Drawing Figure

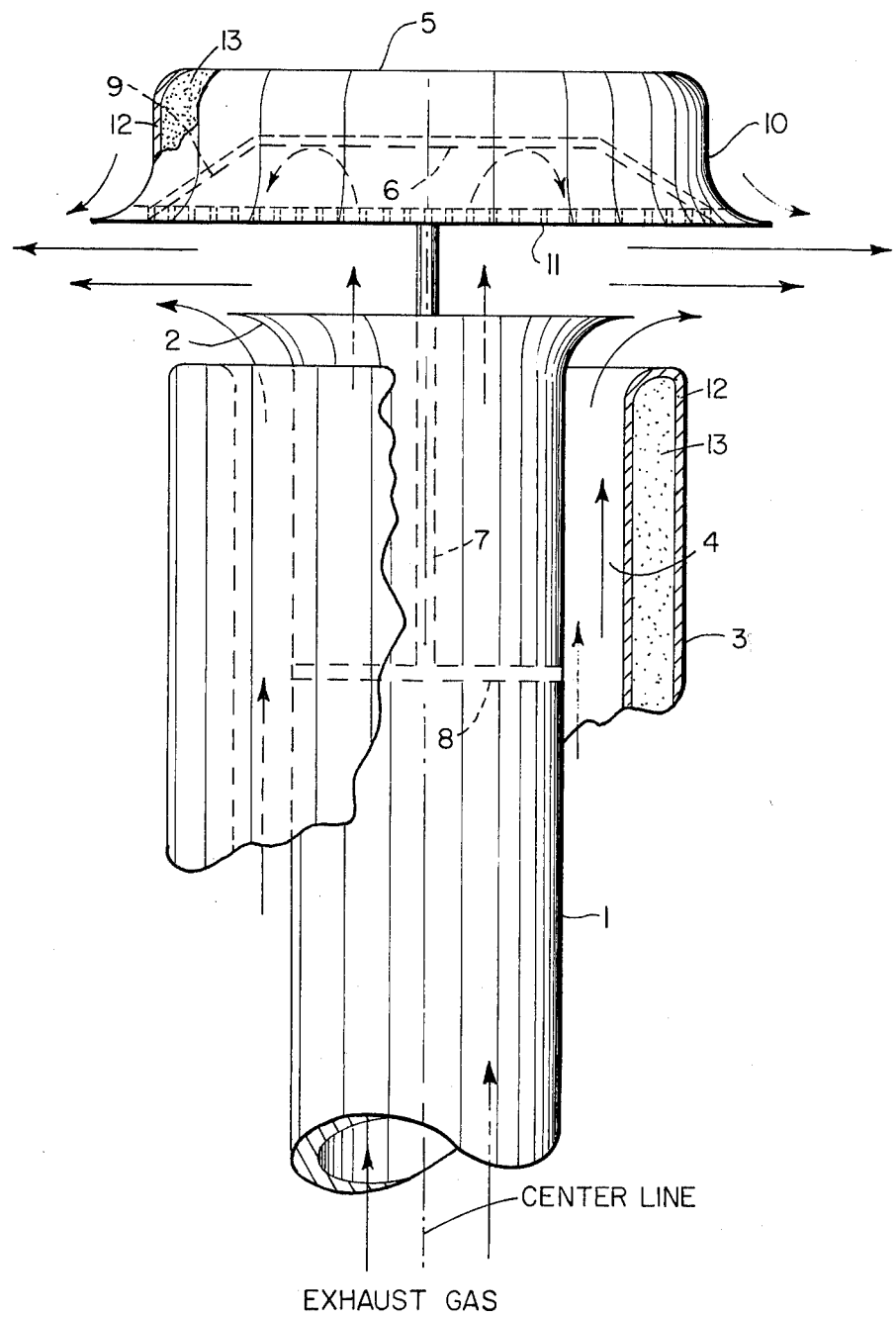

DISPERSION EXHAUSTER FOR ENGINES AND COMBUSTION HEATERS

This invention described herein may be manufactured, used and licensed by or for the Government of the United States of America without the payment to me of any royalties thereon.

This invention relates to the field of infrared camouflage for engines and combustion heaters.

It has long been conventional practice to camouflage equipment from aerial surveillance through the utilization of camouflage nets. However, while these nets are successful in visually hiding equipment such as engines and combustion heaters, these nets do not prevent detection by modern infrared (IR) surveillance techniques. This failure is due to the exhaust gases emitting from the engine or heater, producing a hot spot that leaves an IR signature readily indentifying the equipment's location.

Numerous attempts have been made to nullify the IR signature by providing the engine or heater with a device to mix the hot exhaust gases with cool air; however, due to their complexity and cost, the use of such devices has been impractical.

It is, therefore, a principal object of this invention to provide a simple and inexpensive means to disperse the hot exhaust gases produced by engines and combustion heaters so as to nullify the IR signature effect of their hot exhaust pipes.

In accordance with the invention, this object is achieved by a flared exhaust pipe located concentrically within an insulating tube so as to provide a passage therebetween for cooling air and which is used additionally in conjunction with an insulator cap.

It is believed that the nature of the invention will be fully apparent from the following detailed description taken in conjunction with the accompanying drawing in which:

The only FIGURE is a partial sectional and partial elevational view of a preferred embodiment of a dispersion exhauster in accordance with the invention.

Referring to the drawing in particular, the embodiment of the invention shown therein comprises a vertical exhaust pipe 1 having a flared upper end 2, and insulating tube 3 and an insulator cap 5. The exhaust pipe and insulating tube 3 are concentrically mounted with respect to each other so as to define a passage 4 for cooling air which enters through an opening or openings in a lower portion of the tube. The upper portion of the insulating tube 3 is provided with an inner contour having a curvature corresponding to that of the flare of the exhaust pipe 1. An insulator cap 5 is held in position above the end of exhaust pipe 1 by an axially extending rod 7 which is connected to the inner wall of the exhaust pipe 1 by a transverse rod or plurality of rods 8.

Both the cap 5 and tube 3 should be a sound absorbing and thermally insulating ceramic such as glass wool contained by any suitable reinforcing structure 12, with the bottom surface 11 being of a perforated material to permit attenuation by the sound absorbing material 13. Furthermore, since materials such as glass wool are of a porous nature and the exhaust gases impact the bottom of the cap 5 at relatively high pressures, a metal divider plate 9 is positioned in the cap 5 above the perforated surface 11 so as to prevent the exhaust gases from passing completely through the glass wool. In this manner the cap is divided into a lower sound attenuation section and an upper thermal insulation section.

In operation, exhaust gases pass upwardly from the pipe 1, impact against insulator cap 5, and are dispersed radially outwardly. As the gases pass outwardly from between exhaust pipe 1 and cap 5 their velocity is increased sufficiently to create an aspirating effect which draws cooling air upwardly from passage 4 and downwardly along the surface 10 of cap 5 (which is preferably flared to facilitate air flow) into the gas stream. The air then mixes with the exhaust gases further cooling and dispersing them.

It is noted that the aspirating effect is achieved from the combined relationships of size, shape and position of the pipe 1, tube 3 and cap 5 and accordingly, these factors may readily be adapted to the particular equipment and use. Likewise, the diffuser of the invention may be used with equipment having horizontal exhausts by insulating the existing exhaust and connecting exhaust pipe 1 via an elbow connector.

Thus it can be seen that the IR signature of engines and combustion heaters will be nullified in a simple manner by the invention through the insulator cap acting to cover the hot spot of the exhaust pipe outlet, while the diffuser as a whole disperses and cools the hot gases over a wide area thereby minimizing detectable temperature gradients.

Various other uses and modifications will be readily apparent to those of ordinary skill in the art, and the invention should not be viewed as limited to the embodiment disclosed beyond the extent defined by the appended claims.

I claim:

1. A dispersion exhauster for engines and combustion heaters comprising: a vertically extending exhaust pipe having a selected center line and having an outwardly flaring upper end, an insulated tube member mounted concentrically and outwardly of said exhaust pipe so as to form a passage therebetween, said tube member having a selected cross sectional area and having an inlet for cooling air in a lower portion and an open upper end spaced from said exhaust pipe and corresponding in shape to said flared end of said exhaust pipe, and an insulator cap member, said cap member having a substantially planar configuration with a lower planar surface with a surface area greater than said selected cross sectional area of said tube member, said cap member connected to said exhaust pipe in spaced relation with said lower planar surface perpendicular to said center line of said exhaust pipe, said cap member containing a sound attenuating and heat insulating material and adapted to cause exhaust gases passing from the upper end of said exhaust pipe to draw cooling air up from said passage as well as down across the cap so as to mix with the exhaust gases thereby cooling and dispersing them and camouflaging the engine or heater from infrared detection.

2. The dispersion exhauster of claim 1 wherein said cap has a downwardly and outwardly flared perimetric surface.

3. The dispersion exhauster of claim 1 wherein said attenuating and insulating material is glass wool.

4. The dispersion exhauster of claim 3 wherein said cap has a perforated lower surface, and wherein a cup-shaped divider plate is positioned within said cap so as to overlay the upper ends of said exhaust pipe and insulating tube thereby dividing the cap into a lower sound attenuation section and an upper thermal insulation section by preventing exhaust gases entering through the perforated surface from passing into the upper section of the cap.

5. The dispersion exhauster of claim 4 wherein said divider plate is trapezoidal in vertical cross-section.

* * * * *